Oct. 10, 1944.  R. E. PECK  2,360,159
CONDUIT CONNECTOR
Filed Nov. 6, 1942

INVENTOR.
Robert E. Peck
BY
Wood, Arey, Herron & Evans
ATTORNEYS

Patented Oct. 10, 1944

2,360,159

UNITED STATES PATENT OFFICE 2,360,159

CONDUIT CONNECTOR

Robert E. Peck, Cincinnati, Ohio, assignor of one-fourth to Wm. Burchenal and one-fourth to Morss Lippincott, both of Cincinnati, Ohio Application November 6, 1942, Serial No. 464,728

5 Claims. (Cl. 285—192)

This invention relates to ducts and conduits of the type employed for conveying air in heating, ventilating and air conditioning systems and it relates particularly to collar-like devices by which unitary lengths of duct may be interconnected with one another to form a run.

In the Robert E. Peck Patent No. 2,226,523 conduit is disclosed which consists essentially of inner and outer tubular sections which are slidable in telescopic relationship with one another and which are made of asbestos-containing material. These sections, when telescopically staggered, may be joined together to form a run of any desired length. One of the features of a construction of this type is that the asbestos material displays a pronounced sound-deadening effect.

It is well recognized that sheet metal conduits have a tendency to rumble when air is passed through them at high velocity. In order to avoid such sound effects the cross sectional area is increased sufficiently to permit delivery of the required volume of air at a lower velocity. The expedient is a costly one yet, to avoid the development of drum effects, ducts always are larger in size than they otherwise need be. However, ducts constructed of an asbestos-containing material, such as those disclosed in the aforesaid Peck patent, do not display this disadvantage. The sound deadening feature enables ducts of small cross sectional area to be used to convey air at velocities considerably higher than those permissible in sheet metal ductwork systems.

High velocity, however, usually entails high pressure inasmuch as friction losses are increased. For ordinary pressures, for example ½" to 2" of water, the unitary lengths of ductwork of the kind shown in the Peck patent may be joined to one another satisfactorily simply by abutting the sections end to end, without grouting. At higher static pressures, for example 6", 7", 8" of water, this construction involves high leakage losses and a principal objective of the present invention has been to provide simple, inexpensive collars through which the sections may be joined together in substantially airtight relationship.

It is to be noted that in the aforesaid Peck patent, each unit length of conduit consists of one tubular member which is relatively hard and firm, such that this section may constitute the structural backbone of the system, while the other telescoping member of the unit has walls which contain air cells by which it is endowed with heat insulating qualities. The collars of the present invention may be used for connecting together the members of either respective type, either independently of one another or in telescoped assembly. But to satisfy the requirements of a system of the latter type, it is an objective of the present invention to provide collars having inner and outer surfaces which reside in substantially flush relationship with the respective inner and outer surfaces of the sections that they inter-connect so that no obstructions are present to interfere when other sections are slid over or slid through them.

Having these principles of the present invention in mind, a preferred embodiment is disclosed in the accompanying drawing in which.

In the preferred embodiment of the invention, the connector unit consists of an inner collar and an outer collar which are arranged concentrically and which preferably are constructed of thin sheet metal material. The annular spaces between the inner and the outer collars at the opposite ends of the unit constitute crevices for receiving the respective endwise marginal portions of the ducts to be inter-connected. The inner and outer collars are supported in spaced apart relationship substantially midway between the opposite ends, and spring leaves extending into the annular crevices from the inner and the outer sections at each end of the unit constitute the obstructions by which the escape of air through the joints is blocked. These leaves, in plane, are yieldable and are spread apart upon insertion of the duct work in the annular cavity, but as the endwise portion of the duct spreads the leaves apart, they, in turn, tend to bite into the duct material and form a seal therewith.

In the preferred structure, the leaves are kinked annularly converging toward themselves to form an annular constriction, then diverging away from one another toward the collars, and then converging again to the point of termination. At the extremities of the diverged portions, the leaves rest against the collars, thereby forming elastic throats which provide an airtight seal.

Figure 1:
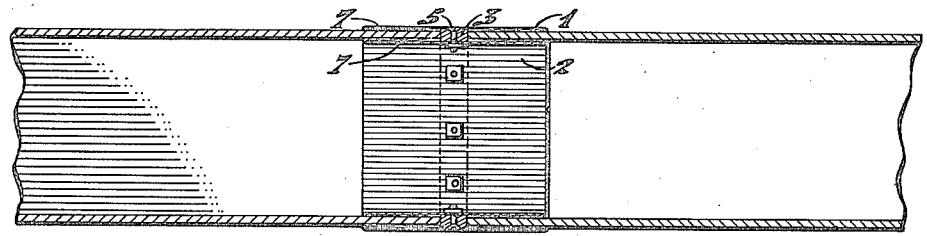
Figure 1 is a cross sectional view through the conduit consisting of adjacent sections of ductwork inter-connected together by a collar.
Figure 2:
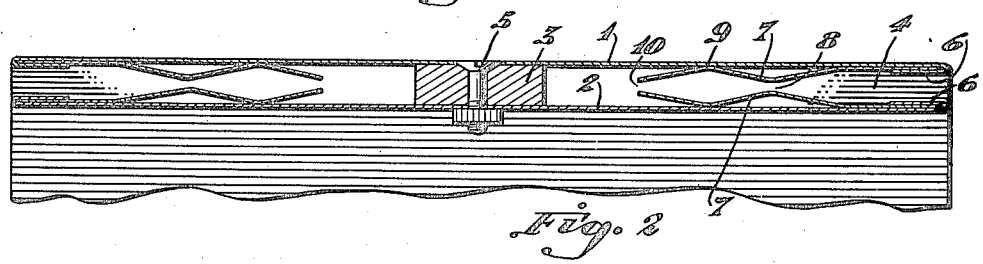
Figure 2 is a cross sectional fragmentary view of a portion of the collar unit.
Figure 3:
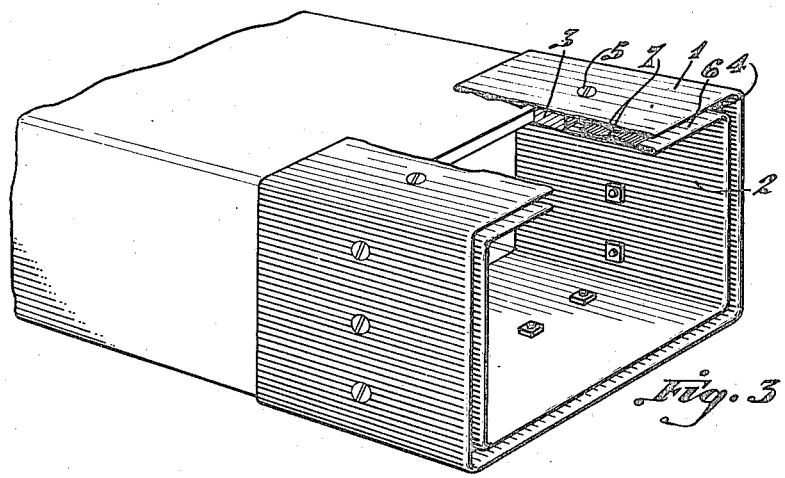
Figure 3 is a perspective view showing the collar connected to the marginal endwise portion of one duct unit with the opposite end ready to receive the marginal endwise portion of the other duct unit.
Figure 4:
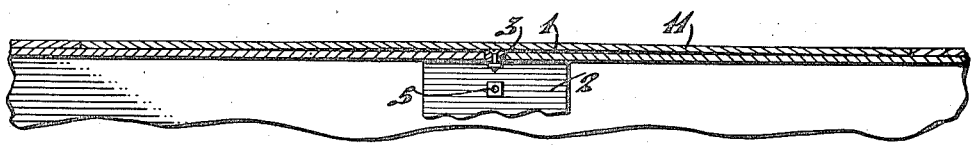
Figure 4 is a fragmentary sectional view of a joint between two duct sections over which an outer insulating member of tubular form has been telescopically arranged.

The preferred collar shown in the drawing is described best with respect to Figures 2 and 3, the outer collar member being designated 1 and the inner collar member being designated 2. These two units, as previously described, are arranged concentrically and are separated one from the other by a spacer 3 to form an annular cavity or recess 4 which corresponds substantially to the thickness of the duct work wall to be received therein. The spacers 3 may be made of wood, asbestos or other suitable material and the collars 1 and 2 are fastened to the spacer by the bolts 5. In place of utilizing spacers 3 as just described, a central portion of the inner or the outer collar member may be provided with an annular rib for holding the collars in spaced relationship and the units fastened to one another suitably as by spot welding.

The opposite ends of the respective collars of this assembly are turned inwardly at 6 so that the edges of the cavity are of rounded configuration and therefore do not tend to scuff or tear the ductwork surfaces. The inturned flanges provide the means of clamping the elastic leaves 7 to the collars in the recess 4.

Leaves 7 are preferably made of thin, spring bronze material and, starting at one point in the annular crevice, the leaves extend peripherally around the recess to the point of origin. The ends may be left unjoined, joined together, or slightly overlapped, as desired. In the preferred embodiment, a continuous length of leaf material is given a kinked configuration as shown in Figure 2 in cross section; in this condition, the continuous length of material may be bent at right angles at the corner without difficulty. At the corners the kinking effect is lost somewhat, but on the other hand, the leakage at these points is at a minimum and there is sufficient distortion of the metal to provide effective seals at these confined areas. The joints in the continuous leaves 7 may, in fact, occur at the corners though this is not necessary.

As shown best in Figure 2, the leaves 7 lie flat against the walls of the collars 1 and 2 at the points where they emerge from the clamping flanges 6 and then straight to converge toward one another to form an elastic throat 8. In the preferred structure, the leaves continue past this throat and diverge from one another to lie in contact with the walls of the collars 1 and 2 as at 9 and then converging again to form a second elastic throat 10 which is located a short distance from the spacer 3. The points 9 at which the leaves contact the collar surfaces, together with the points adjacent the flanges 6 to which the leaves are fastened to the collars, constitute fulcrums for buttressing the leaves. This arrangement enables very light and very elastic metal to be used satisfactorily. Where relatively light static pressures are to be accommodated, the leaves may simply be converged toward one another without being provided with the additional configuration, though this arrangement does not provide a satisfactory seal for high static pressures and is therefore to be considered as only a partial equivalent.

When the collar is to be used, it is slipped over the endwise portion of one duct, the duct being introduced into the recess until it abuts the spacer 3. During this operation, the leaves 7 are flattened out and tend to lie against the respective walls of the inner and the outer collars, meanwhile pressing tightly against the duct, especially at the throat 8 and the throat 10. The endwise portion of an adjoining duct is then introduced into the annular recess at the opposite end of the collar and the connection is completed.

It is to be noted that the outer and inner collars 1 and 2 are constructed of relatively lightweight sheet metal, the flanges 6 providing the reinforcement which is desirable at the ends. The outer surface of the collar 1 thus lies substantially flush with the plane of the ducts connected to it, and the inner surface of the inner collar 2 is also substantially flush with the interior duct areas. At the inside of the duct, therefore, there is no obstruction by which air friction is increased, while at the outside the flush relationship permits outer duct unit 11 to be slid telescopically over the joint and to conceal it.

The endwise portions of the leaves 7 may terminate in straight sharp edges if desirable, as shown in Figure 2. These edges tend to bite into the surface of the duct if an attempt is made to withdraw it from the connector unit, and in this capacity, they therefore provide some structural rigidity. If desirable, the endwise portions of the leaves may be flared outwardly if connectors which are readily dismantled are desired.

While leaves are employed to extend from both the outer collar and the inner collar into the annual recesses in the preferred structure of the present invention to provide a double seal effect, the leaves may extend from only one of the collars, if desirable. It is to be noted, however, that in the former type of construction any air passing through the seal provided by one of the leaves tends to exert its pressure on the other of the leaves and force it into the duct wall surface so that the greater the air pressure becomes through leakage past one of the leaves, the greater is the sealing effect exerted by the other.

Having described my invention, I claim:

1. A coupler for joining conduits in end to end connection comprising a pair of tubular members arranged one within the other in spaced relationship and delineating annular recesses therebetween, yieldable leaves of metal fastened to the tubular members and extending into said recesses respectively to provide annular yieldable throats therein, the said leaf members being adapted to be sprung upon insertion of the endwise portion of a duct into each recess, with each leaf arranged to form a pressure seal against the duct wall, the said leaf members arranged to contact said duct walls substantially throughout their entire peripheries.

2. A connector fitting for joining the endwise portions of conduits to one another, said fitting comprising a pair of tubular members arranged one within the other concentrically but spaced apart from one another to provide an annular recess at each end of said fitting for receiving an endwise portion of a duct, leaf members extending peripherally into said recesses in converging relationship to form restricted throats therein, which throats extend throughout substantially the entire periphery of said recesses, the said leaf members being spreadable to permit insertion of the endwise portion of a duct into the recesses and adapted to form substantially continuous pressure seals with the walls of ducts respectively inserted into said recesses.

3. A fitting for connecting ducts to one another to form a substantially airtight seal, said fitting comprising a pair of collar members which are supported in spaced concentric relationship to one another thereby providing annular recesses into which ducts may be entered at each end of the fitting, the said fitting at each of said recesses having at least one leaf member extending peripherally into the recess from one of said tubular members so as to yieldably constrict the recess opening, the said leaf member being arranged to be sprung when an endwise portion of a duct is entered into said recess and forms a substantially pressure tight seal with the wall of the duct.

4. A fitting of the type described, comprising a pair of collars supported in spaced concentric relationship to one another to provide recesses at the opposite ends of the fitting into which the endwise portions of duct members may be entered, each endwise portion of each collar member being turned inwardly upon itself to form a flange, leaf members extending from said flanges substantially continuously about the inner peripheries of said collar members and fastened by said flanges, the said leaf members converging toward one another to provide yieldable throats in said recesses respectively, the said leaves adapted to be sprung apart to lie substantially against the walls of the tubular members by the walls of duct inserted in said recesses.

5. A fitting of the type described, comprising a pair of collars supported in spaced concentric relationship to one another to provide recesses at the opposite ends of the fitting into which the endwise portions of duct members may be entered, leaf members extending peripherally of said collars into said recesses to provide yieldable throats therein respectively, the said leaves adapted to be sprung apart to lie substantially against the walls of the tubular members by the walls of duct inserted in said recesses, and also press against the duct walls contained within said recesses to form pressure seals therewith, the said leaves being configurated in cross section to provide at least two peripheral lines of contact between each leaf and the wall of the duct against which it presses.

ROBERT E. PECK.